March 10, 1964 L. BANET ETAL 3,124,685
THERMAL RADIATION EXPLOSION LOCATOR
Filed Sept. 28, 1954 2 Sheets-Sheet 1

Leo Banet
Abraham Hirschman
INVENTORS

BY George Sipkin
Lee I. Huntzberger
ATTORNEY

March 10, 1964    L. BANET ETAL    3,124,685
THERMAL RADIATION EXPLOSION LOCATOR
Filed Sept. 28, 1954    2 Sheets-Sheet 2

Leo Banet
Abraham Hirschman
       INVENTORS

BY *George Sipkin*
*Lee J. Huntzberger*
       ATTORNEY

United States Patent Office 3,124,685
Patented Mar. 10, 1964

3,124,685
THERMAL RADIATION EXPLOSION LOCATOR
Leo Banet, New York, N.Y. (41—11 40th St., Long Island City, N.Y.), and Abraham Hirschman, New York, N.Y. (30—33 82nd St., Jackson Heights, N.Y.)
Filed Sept. 28, 1954, Ser. No. 458,994
17 Claims. (Cl. 250—83)
(Granted under Title 35, U.S. Code (1952), sec. 266)

The invention described herein may be manufactured and used by or for the Government of the United States of America for governmental purposes without the payment of any royalties thereon or therefor.

The present invention concerns a thermal explosion locater and in particular concerns a device of this type for improved location of atomic bomb detonation, and specifically for the location of the detonation center and for an estimate of bomb power.

There are no satisfactory devices for this purpose. Prior art devices which have been developed and which employ sensitive, radiation-indicating surfaces have proved to be impracticable both because of lack of sensitivity and because of faulty design rendering them inoperative. It is well established that direct visual observation and locating of the atomic bomb detonation center is both inaccurate and impractical. Other methods of detection such as those employing photographic apparatus are too slow, too complex, and require costly equipment and the personal adjustments and timing. Therefore they are not practical for applications which require numerous locations and ever ready operations such as would be required in civilian defense.

The device of the present invention utilizes the principle of scorching as in concentrating the sun's rays through a magnifying glass. This type locator has a lens mounted in the front of a box and a calibrated screen placed at the focal point. When the device is exposed to thermal energy the radiation is focused to an area the size of a large pinhead on the screen. The resulting heat intensity per unit area on the screen is many times that impinging upon the lens.

Novel features of the present invention include the use of a pinhole or lens to direct and record the radiation of an atomic bomb on a heat sensitive surface; the use of suitably arranged material surface to indicate atomic bomb detonation and to use this indication to locate the center of the detonation and the intensity of the bomb by means of suitably mapped surfaces and mathematical methods; the use of lenses to concentrate the radiation and thus increase considerably the detection range of these devices which, in turn, will make it possible to reduce the number of devices required to serve a given area; the use of a single lens system for a survey of radiation emanating from 360 degrees in one plane; and the use of enclosures of heat-sensitive surfaces for the purpose mentioned. These enclosures are particularly useful in protecting the surfaces against weathering.

An object of the invention is to provide a thermal explosion locator.

Another object is to provide a device of this type that is inexpensive and may therefore be widely employed for military or civilian defense where numerous units may be needed.

Another object is to provide a device of this type in which the construction is simple and does not require critical materials.

Another object is to provide a device of this type that is ready for instantaneous use and that records automatically and does not require personal attendance or adjustments after its initial installation.

Another object is to provide a device of this type that does not contain any moving parts and does not require cable installation or electrical power as are used in electrical devices for similar purposes.

Another object is to provide a device of this type that is self-sufficient, is durable and requires only a minimum of maintenance operation.

Another object is to provide a device of this type that automatically protects the sensitive recordings surfaces against deposits and effects of weathering.

Another object is to provide the device of this type that can be employed for extensive periods of time with a minimum amount of maintenance operation. After a bomb detonation it may be reemployed if the sensitive surfaces are replaced.

Another object is to provide a device of this type that is not subject to failure since it has not wearing components or moving parts which could be disturbed by the extreme effects of an atomic blast.

Other objects and many of the attendant advantages of this invention will be readily appreciated as the same becomes better understood by reference to the following detailed description when considered in connection with the accompanying drawings wherein.

Figure 1:
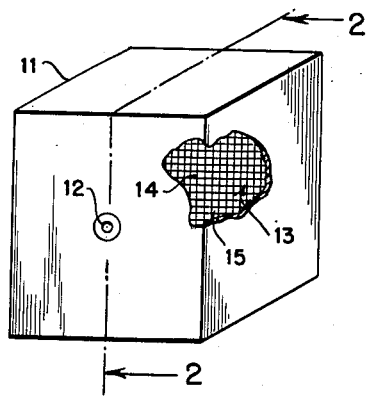
FIG. 1 is a perspective view of a preferred embodiment of the invention.
Figure 2:
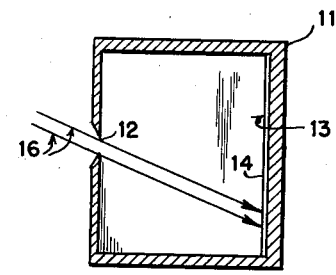
FIG. 2 is a cross-sectional view along lines 2—2 of FIG. 1.

The construction of the thermal explosion locator is based upon the observation that the fire ball radiation of an atomic bomb has a very similar propagation to visible radiation and therefore can be permanently recorded by a heat-sensitive surface which faces approximately in the direction of the fire ball. Because of the similarity of the optical radiation, it is possible to use established principles and techniques to concentrate and to receive the radiation upon the screen of a camera as shown in FIG. 1. Formed in the front of box 11 is a pinhole 12 to permit entry of energy radiation into box 11. In place of pinhole 12 there may be mounted a suitable lens for concentrating the radiation. The lens material may be that of conventional glass since the radiant energy in the visible spectrum is adequate for this purpose. Inside of box 11 and opposite pinhole 12 is a film 13 having a heat-sensitive surface 14 that may be formed of heat-sensitive paint, textile, paper, chemical or other material. The material from which box 11 is formed is not critical since it only serves as an enclosure for film 13 and a mounting for pinhole 12 or the lens. Heat-sensitive surface 14 may be provided with a suitable geometric screen 15 to facilitate the location of the detonation center of the bomb. No shutter is required because the intensity of ordinary light rays is not sufficient to cause a recording upon film 13. Energy radiation is indicated diagrammatically by parallel rays 16 that enter through pinhole 12 and strike heat-sensitive surface 14 to cause a recording thereon.

Figure 3:
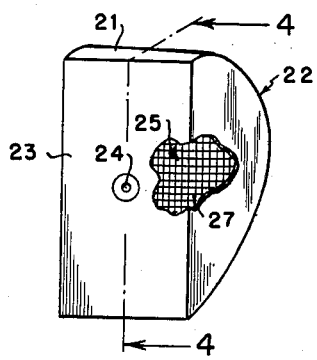
FIG. 3 is a perspective view of an alternate embodiment of the invention.
Figure 4:
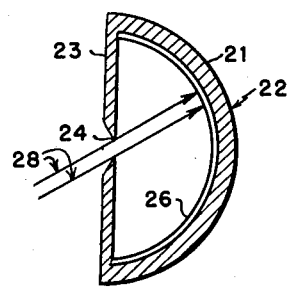
FIG. 4 is a cross-sectional view taken along lines 4—4 of FIG. 3.

If desired the camera can be made of the shape shown in FIGS. 3 and 4 wherein box 21 is formed with a cylindrical back 22 and a flat front 23. Pinhole 24 is formed in the front of box 21 and film 25 having heat-sensitive surface 26 is disposed on the concave inner surface of back 22. Heat-sensitive surface 26 may be provided with a suitable geometric screen 27 as seen in FIG. 3. Energy radiation is indicated diagrammatically by parallel rays 28 that enter pinhole 24 and strike heat-sensitive surface 26 to cause a recording thereon.

Figure 5:
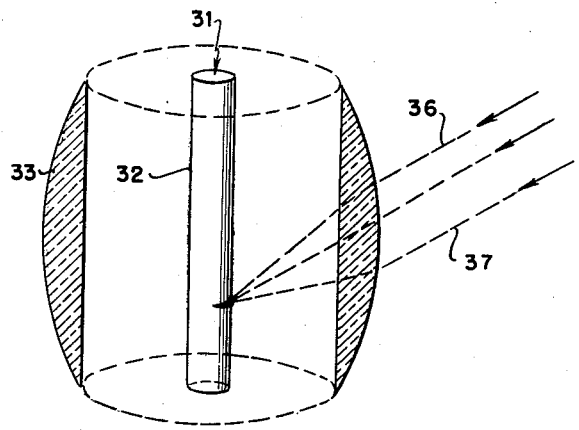
FIG. 5 is a perspective view in diagrammatic form of another embodiment of the invention.
Figure 6:
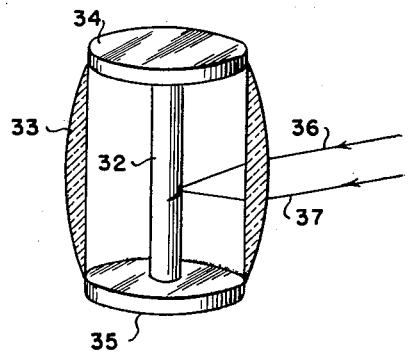
FIG. 6 is a view similar to FIG. 5 with the covers in position.
Figure 7:
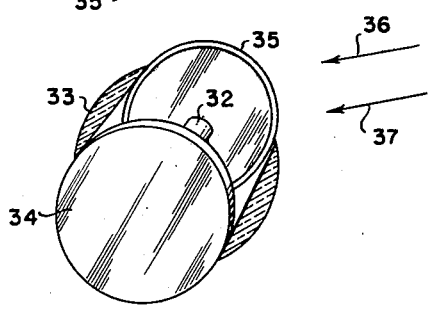
FIG. 7 is a perspective view of FIG. 6 as seen from the bottom thereof.

As seen in FIGS. 5, 6, and 7 the thermal explosion locator may make use of a single lens system for the survey of radiation emanating from 360 degrees in one plane. There is shown a cylinder 31 having a heat-sensitive film 32 covering the outside thereof. Surrounding cylinder 31 and coaxial therewith is a sphero-cylindrical lens assembly 33. As seen in FIGS. 6 and 7 protective covers 34 and 35 may be mounted at the ends of cylinder 31. Radiant energy is indicated diagrammatically by parallel rays 36, 37 and 38 that enter through lens 33 and strike the surface of film 32 to make a recording thereon.

In operation the thermal explosion locator is placed in a suitable position to receive radiation from a bomb upon explosion. With the type of locators shown in FIGS. 1 to 4 the box 11 or 21 is positioned so that the pinhole opening 12 or 24 or the lens faces the probable area of bomb explosion. In use of a locator of the type shown in FIGS. 5 through 7 the locator can receive radiation emanating from 360 degrees throughout one plane and can therefore be located without regard to the direction in which it faces with respect to a plane perpendicular to its axis. With either type of locator it is necessary to position the locator in an exposed position whereby radiant energy from the bomb explosion can be received and recorded upon the sensitive film.

After a bomb explosion and recording of radiant energy upon the heat-sensitive film it is possible to establish the direction of the center of bomb explosion by establishing a line from the locator in the direction that radiant energy is received. By using two or more locators and thereby establishing two or more lines the center of the bomb explosion can be established by ascertaining the point of intersection of the two lines projected from the locators. The estimate of the bomb size can be made from triangulation and from the known response of the heat-sensitive material which can be evaluated at a laboratory by suitable means. The heat intensity per unit area on the screen is an indication of intensity of bomb explosion.

Obviously many modifications and variations of the present invention are possible in the light of the above teachings. It is therefore to be understood that within the scope of the appended claims the invention may be practiced otherwise than as specifically described.

We claim:

1. A thermal explosion locator comprising a box resistant to thermal radiation, a mapped heat-sensitive film in said box and sensitive solely to intense thermal energy radiations such as those from an atomic explosion and not sensitive to ambient heat, and an optical opening in an upright wall of said box remote from but in front of said film for transmitting a beam of any incoming heat radiation to a part only of said film, the particular part depending on the angle at which the radiation enters said box through said opening.

2. The locator of claim 1 in which said film is flat.

3. The locator of claim 1 in which said film is concave and semi-cylindrical.

4. A thermal explosion locator comprising a cylinder, a heat-sensitive film on said cylinder which is sensitive solely to radiations from intense heat such as from an atomic explosion and not sensitive to ambient heat, and a sphero-cylindrical lens disposed coaxially about said cylinder for focusing incoming radiation on said film.

5. A thermal exposion locator comprising a cylinder, a heat-sensitive film on said cylinder which is sensitive solely to radiations from intense heat such as from an atomic explosion and not sensitive to ambient heat, a sphero-cylindrical lens disposed coaxially about said cylinder for focusing incoming radiation on said film, and a calibrated screen on said film.

6. The method of locating the position of an intense explosion relatively to a reference base, which comprises directing, at each of different observing stations spaced a known distance apart, a relatively small diameter beam of radiation from said explosion by optical means upon a small local area only of a mapped radiation sensitive surface which is sensitive solely to energy radiation from very intense heat such as from an atomic explosion and not to ambient radiation, the particular local area at each station depending upon the direction at which such radiation passes through said optical means, whereby comparison and triangulation using the directions at which the radiation reaches the said local areas of the radiation sensitive surfaces at said observing stations, one may determine the direction, elevation and approximate distance away of said explosion relative to said reference base.

7. An explosion locator comprising a substantially closed casing having a small aperture in one wall thereof and opaque to intense radiation such as from an explosion, a surface which is permanently modified by intense radiant energy from said exposion and is not visibly modified by ambient radiant energy, provided within said casing opposite and spaced from said aperture and of considerably greater size than said aperture, whereby when a beam of radiant energy from a thermal explosion enters said casing through said aperture it will fall on and modify a very small local area only of said sensitive surface, and by the position of said modified local area relatively to said aperture, one may determine the direction from which the modifying radiation came.

8. The locator as set forth in claim 7, and a converging lens in said aperture for concentrating incoming radiation upon a relatively small local area of said surface.

9. A self-sufficient and self-operating device unaffected by adverse weather conditions to which it may be exposed in use for determining the direction of the source of an intense explosion relatively to an observation station which comprises, for use at said observation station, a camera having an enclosure resistant to intense transitory thermal radiation, a film in said enclosure having a surface sensitive to heat radiation from intense explosions and insensitive to ambient heat radiation and said enclosure having shutterless optical means in a wall thereof in front of and spaced from said surface and operable to image upon a relatively small local area only of said surface a beam of intense thermal radiation from an explosion, depending for the location of said area upon the direction from which the thermal radiation beam is received by said optical means, leaving the balance of the area of said surface relatively unmodified by heat radiation.

10. The device as set forth in claim 9, wherein said film has a geometric screen that facilitates the indication of the direction therefrom of the detonation center of an explosion.

11. The device as set forth in claim 9, wherein said optical means includes a lens for concentrating a beam of approximately parallel heat rays upon said local area.

12. A self-sufficient and self-operating device unaffected by adverse weather conditions to which it may be exposed in use, for use in determining the direction of the source of an intense explosion relatively to an observation station, which comprises a weather resisting enclosure opaque to an intense radiation from said explosion, and having therein a surface of a heat sensitive material which manifests no visible change until its temperature is raised to exceed that any temperature to which it is likely to be exposed in use in the absence of said intense explosion, and which changes in visibility, when exposed to a temperature above said normal, and also having optical means exteriorly exposed to heat radiation and operable to image upon a relatively small local area only of said surface, a small beam of intense thermal radiation from an explosion, said local area depending for its position on said surface upon the direction from which said beam is received by said optical means, leaving the balance of said surface relatively unmodified in its appearance by such heat radiation.

13. The device as set forth in claim 12, wherein said optical means is a lense forming a part of the wall of said enclosure.

14. The device as set forth in claim 12 wherein said surface is a mapped screen for facilitating the indication of the direction and elevation angle of the radiation beam from the detonation center of an explosion.

15. A self-sufficient and self-operating device, unaffected by adverse whether conditions to which it may be exposed in use, for use in determining the direction of the source of an intense explosion relatively to an observation station, which comprises a weather resisting enclosure of approximately radiation opaque material having therein an upright surface of a heat sensitive material which manifests no visible change until its temperature well exceeds that to which it is likely to be exposed in use in the absence of said intense explosion, and which changes in visibility when exposed to radiation from said intense explosion, said enclosure having in an upright wall thereof, shutterless optical means exposed to heat radiation from the exterior of the enclosure and operable to direct a beam of relatively small cross sectional area of intense thermal radiation from an explosion upon a relatively small local area only of said surface that depends, for its location on said surface, upon the direction from which said beam enters said enclosure through said optical means, leaving the balance of said surface relatively unmodified in appearance by said beam.

16. A self-sufficient and self-operating device, unaffected by adverse weather conditions to which it may be exposed in use, for use in ascertaining the location and elevation of the center of detonation of an intense explosion, which comprises an upright screen having a heat sensitive surface that changes its appearance in any local area thereof upon which a beam of thermal radiation falls, but not materially affected in appearance by thermal radiation incident thereon and which is of much less intensity than that from an intense explosion, and means opaque to an intense radiation from an explosion for shielding said screen from weather and radiation to which it may be exposed in use but operable to direct a beam of thermal radiation from an intense explosion against a small local area only of said surface of said screen, leaving the balance of the area of said screen surface substantially free of contact therewith by said beam.

17. A self-sufficient and self-operating device unaffected by adverse weather conditions to which it may be exposed in use for determining the direction of the source of an intense explosion relatively to an observation station which comprises, for use at said observation station, a recording direction finder having an enclosure resistant to intense transitory thermal radiation, a film in said enclosure having a surface sensitive to heat radiation from intense explosions and insensitive to ambient heat radiation and said enclosure having an aperture in a wall thereof in front of and spaced from said surface and operable to image upon a relatively small local area only of said surface a beam of intense thermal radiation from an explosion, depending for the location of said area upon the direction from which the thermal radiation beam is received by said aperture, leaving the balance of the area of said surface relatively unmodified by heat radiation.

References Cited in the file of this patent
UNITED STATES PATENTS

| | | |
|---|---|---|
| 2,344,824 | Landis et al. | Mar. 21, 1944 |
| 2,472,879 | Bayle | June 14, 1949 |
| 2,544,261 | Gibson | Nov. 6, 1951 |
| 2,615,249 | Allard | Oct. 28, 1952 |
| 2,696,050 | Taylor | Dec. 7, 1954 |
| 2,705,757 | Shurcliff | Apr. 4, 1955 |
| 2,740,895 | Miller | Apr. 3, 1956 |